UNITED STATES PATENT OFFICE.

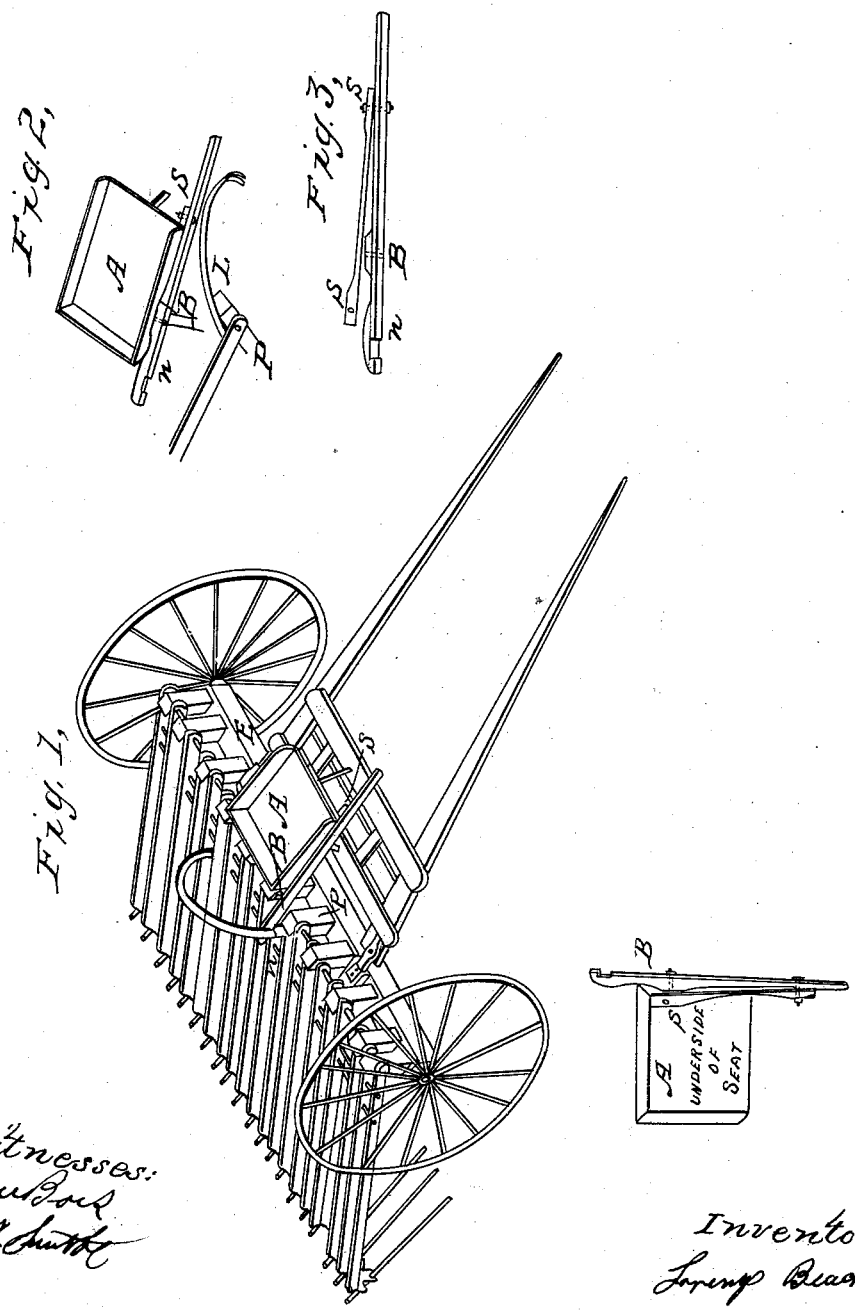

LORENZO BEACH, OF MONTROSE, PENNSYLVANIA.

IMPROVEMENT IN HORSE-RAKES.

Specification forming part of Letters Patent No. 41,270, dated January 19, 1864.

*To all whom it may concern:*

Be it known that I, LORENZO BEACH, of Montrose, in the county of Susquehanna, in the State of Pennsylvania, have invented a new and useful Improvement in Horse-Rakes, and I do hereby declare that the following is a full and exact description of the same, reference being had to the accompanying drawings, making a part of this specification, in which—

Figure 1 is a perspective view of my improved horse-rake. Fig. 2 is a side view of the seat with the spring and lever attached, and showing the position of the upright lever and post while dumping the hay; Fig. 3, the lever and spring detached.

Similar letters of reference indicate corresponding parts in the several figures.

The object of this invention is to produce a rake by which the operation of "dumping" the hay may be most easily performed by the driver while sitting in his seat.

In the accompanying drawings, A may represent the seat, with the horizontal lever B attached to the side thereof, having also a spring-bar, s, attached to the under side of the same, which spring-bar is also attached to the forward end of the lever B. The horizontal lever B is provided with a notch, n, by which it is attached to the upright lever L while raking. The upright lever L is attached to the axle E and post P, and while in connection with the lever B holds the rake in position while raking.

The operation of dumping the hay is performed by the driver pressing his knee or leg against the horizontal lever B, which releases the upright lever L from the notch n, when the posts that hold the arms of the rake are thrown forward, and by their weight elevate the arms and teeth sufficiently to release the hay. As soon as the hay is released the operator raises the lever L slightly, when the arms and teeth fall back to their place again, ready to take up the hay.

Having thus described my invention, what I claim as new, and desire to secure by Letters Patent, is—

In combination with the upright lever L, the horizontal lever B and spring-bar S, operating substantially in the manner described.

LORENZO BEACH.

Witnesses:
  CHARLES AVERY,
  JOHN W. COBB.